United States Patent
Jiang et al.

(10) Patent No.: US 11,831,368 B2
(45) Date of Patent: Nov. 28, 2023

(54) RELAY DOCK AND BASE STATION WITH POSITION INFORMATION BASED DIRECTIONAL WAVE FORMING

(71) Applicant: Apple Inc., Cupertino, CA (US)

(72) Inventors: Yi Jiang, Cupertino, CA (US); Mattia Pascolini, San Francisco, CA (US); Jiangfeng Wu, San Jose, CA (US); Siwen Yong, San Francisco, CA (US); Lijun Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/589,731

(22) Filed: Jan. 31, 2022

(65) Prior Publication Data
US 2022/0158692 A1    May 19, 2022

Related U.S. Application Data

(63) Continuation of application No. 17/000,139, filed on Aug. 21, 2020, now Pat. No. 11,271,618, which is a continuation of application No. 16/136,144, filed on Sep. 19, 2018, now Pat. No. 10,756,788.

(60) Provisional application No. 62/562,261, filed on Sep. 22, 2017.

(51) Int. Cl.
*H04B 7/0426* (2017.01)
*H04B 7/155* (2006.01)
*H04B 10/114* (2013.01)
*G06V 40/10* (2022.01)

(52) U.S. Cl.
CPC ........... *H04B 7/043* (2013.01); *G06V 40/103* (2022.01); *H04B 7/15521* (2013.01); *H04B 10/1141* (2013.01); *H04B 10/1149* (2013.01)

(58) Field of Classification Search
None
See application file for complete search history.

(56) References Cited

U.S. PATENT DOCUMENTS

| | | |
|---|---|---|
| 10,080,146 B2 | 9/2018 | Sundstrom et al. |
| 10,178,560 B2 | 1/2019 | Black et al. |
| 10,756,788 B1 | 8/2020 | Jiang et al. |
| 2006/0256959 A1 * | 11/2006 | Hymes .............. H04W 4/21 379/433.04 |
| 2012/0320819 A1 | 12/2012 | Kim et al. |
| 2016/0198499 A1 | 7/2016 | Lee et al. |
| 2018/0191422 A1 * | 7/2018 | Xia .............. H04B 7/0695 |
| 2019/0014510 A1 | 1/2019 | Rune |

(Continued)

FOREIGN PATENT DOCUMENTS
WO    2015090353    6/2015

OTHER PUBLICATIONS

U.S. Appl. No. 17/000, 139, filed Aug. 21, 2020, Yi Jiang et al.

*Primary Examiner* — Adolf Dsouza
(74) *Attorney, Agent, or Firm* — Alexander A. Knapp; Kowert, Hood, Munyon, Rankin & Goetzel, P.C.

(57) ABSTRACT

A wireless communication system comprises a base station and one or more relay docks and transmits directional wave signals between components using high frequency waves, such as millimeter waves. A beam forming decision engine utilizes position information collected from one or more position or motion sensors of a user device to determine a direction in which to form a directional wave signal being transmitted between components of the wireless communication system.

20 Claims, 9 Drawing Sheets

(56) References Cited

U.S. PATENT DOCUMENTS

| | | |
|---|---|---|
| 2019/0081739 A1 | 3/2019 | Nammi |
| 2020/0075015 A1 | 3/2020 | Taki et al. |

\* cited by examiner

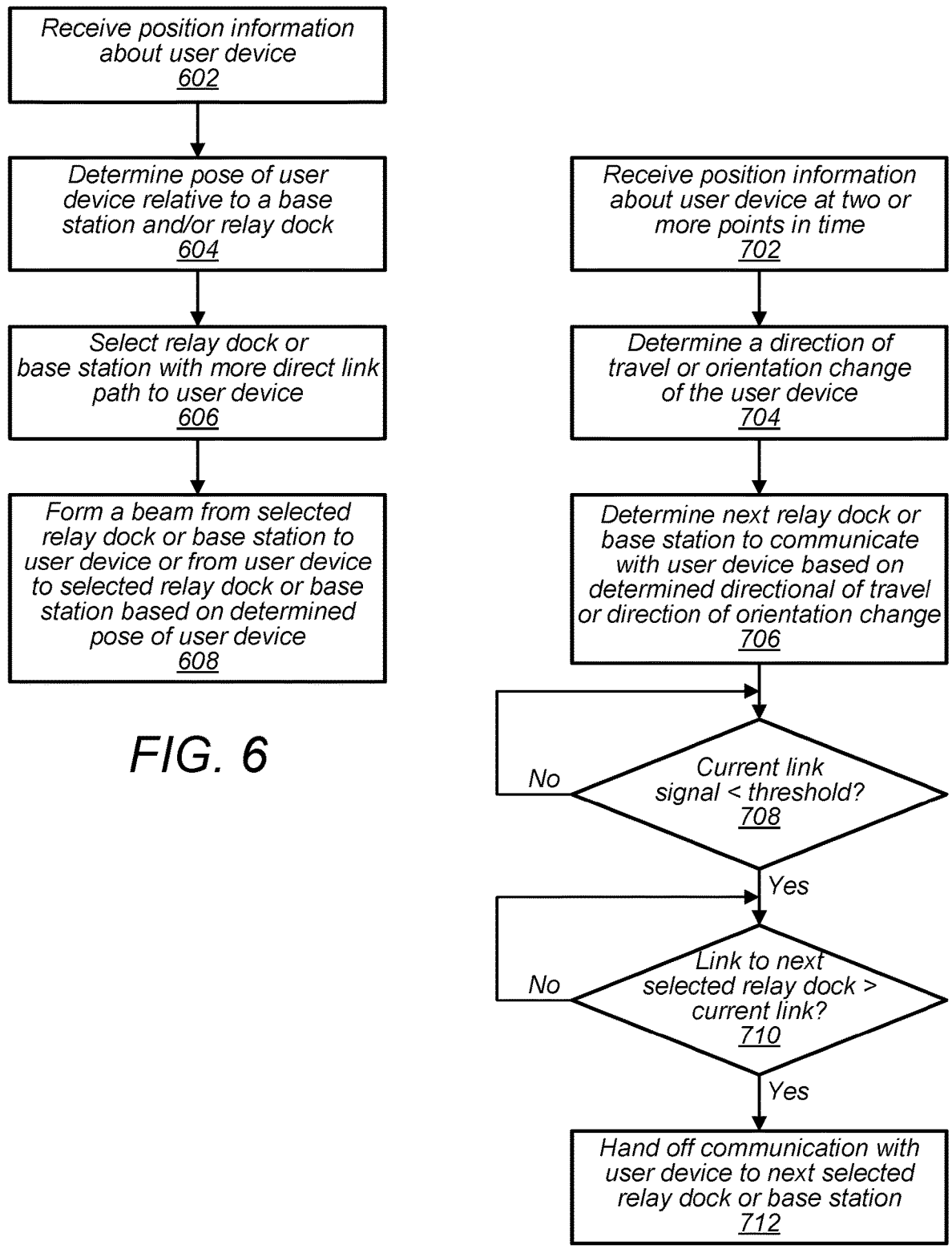

RELAY DOCK AND BASE STATION WITH POSITION INFORMATION BASED DIRECTIONAL WAVE FORMING

PRIORITY DATA

This application is a continuation of U.S. patent application Ser. No. 17/000,139, filed Aug. 21, 2020, which is a continuation of U.S. patent application Ser. No. 16/136,144, filed Sep. 19, 2018, now U.S. Pat. No. 10,756,788, which claims benefit of priority to U.S. Provisional Application Ser. No. 62/562,261, filed Sep. 22, 2017, which are incorporated herein by reference in their entirety.

BACKGROUND

Technical Field

This disclosure relates generally to wireless communication systems and techniques for directing directional wave signals between components of a wireless communication system.

Description of the Related Art

Wireless communication systems are increasingly widespread. Additionally, there exist numerous different wireless communication technologies and standards. Some examples of wireless communication standards include IEEE 802.11 (WLAN or Wi-Fi, for example 802.11 ad and 802.11 ay), IEEE 802.15 (WPAN), IEEE 802.16 (WiMAX), and others.

Furthermore, as applications and devices continue to require higher levels of bandwidth for wireless communications, higher frequency waves are being used to transmit more data. For example, IEEE 802.11 ad provides for gigabit per second speeds using 60 GHz frequency band waves. However, high frequency waves, such as 60 GHz waves, cannot typically penetrate walls or other solid structures. Also, such high-frequency waves may have greater decay over a given distance than lower frequency waves, such that a range of a transmitter transmitting such high-frequency waves may be reduced as compared to a transmitter transmitting lower frequency waves.

In some wireless communication systems using high-frequency waves, such as 60 GHZ waves, beam forming techniques may be used to direct a high-frequency wave toward an intended receiver. However, if a clear line-of-sight is not available or an intended receiver is out of a range of the transmitter, such systems may not function properly. Additionally, if a line-of-sight of an established link between a transmitter and receiver becomes blocked, for example due to movement of the receiver or transmitter, such systems may lose communication for non-trivial amounts of time while searching for a new link.

SUMMARY OF EMBODIMENTS

In some embodiments, a system includes a user device comprising an antennae array configured to transmit and receive directional wave signals, a communication station comprising an antennae array configured to transmit or receive directional wave signals, and one or more sensors configured to detect a position of the user device. For example, in some embodiments, the one or more sensors configured to detect a position of the user device may include an inertial measurement unit (IMU) included in the user device, a GPS system included in the user device, or other positioning and/or orientation systems included in the user device. Additionally, in some embodiments, the one or more sensors configured to detect a position of the user device may be separate from the user device. For example the one or more sensors may be cameras or other sensors in a room that detect a position of the user device. Also, in some embodiments, the communication station may be a base station that communicates with the user device, or may be a relay dock that relays communications between a user device and a base station. The system further includes a beam forming engine configured to receive position information from the one or more sensors, wherein the position information comprises a detected location or orientation of the user device. The beam forming engine is further configured to determine a current pose of the user device relative to the communication station based, at least in part, on the received position information and cause a set of one or more antennas of the antennae array of the user device or a set of one or more antennas of the antennae array of the communication station to form one or more directional wave signals based, at least in part, on the determined current pose of the user device.

In some embodiments, a beam forming engine may be implemented in hardware, such as via a specially designed chip, such as an ASIC designed to implement the beam forming engine. In some embodiments, a beam forming engine may be implemented in software as computer instructions stored in a memory that when executed on one or more processors, cause the one or more processors to implement the beam forming engine. In some embodiments, a beam forming engine may be implemented in a base station, a relay dock, a user device, or any combination thereof.

In some embodiments, a method includes receiving, by a communication station, position information from one or more sensors, wherein the position information indicates a location or orientation of a user device and determining a current pose of the user device relative to the communication station based, at least in part, on the received position information. The method further comprises forming a beam comprising directional wave signals directed at the user device based, at least in part, on the current pose of the user device.

In some embodiments, a relay dock includes an antennae array configured to transmit or receive directional wave signals and a beam forming engine. The beam forming engine may include program instructions that when executed by one or more processors causes the one or more processors to receive position information, wherein the position information comprises a location or orientation of a user device. The beam forming engine may also include program instructions that cause the one or more processors to receive a signal from a base station, wherein the signal is intended for the user device. The beam forming engine may cause a set of one or more antennas of the antennae array of the relay dock to form one or more directional wave signals directed at the user device based, at least in part, on the current pose of the user device, wherein the one or more directional wave signals communicate the signal received from the base station to the user device.

BRIEF DESCRIPTION OF THE DRAWINGS

FIG. 6 is a flow diagram illustrating a communication station forming a directional wave signal based on received position information about a user device, according to some embodiments.

FIG. 7 is a flow diagram illustrating a communication station selecting a next relay dock or base station to be used to communicate with a moving user device, according to some embodiments.

Figure 1A:
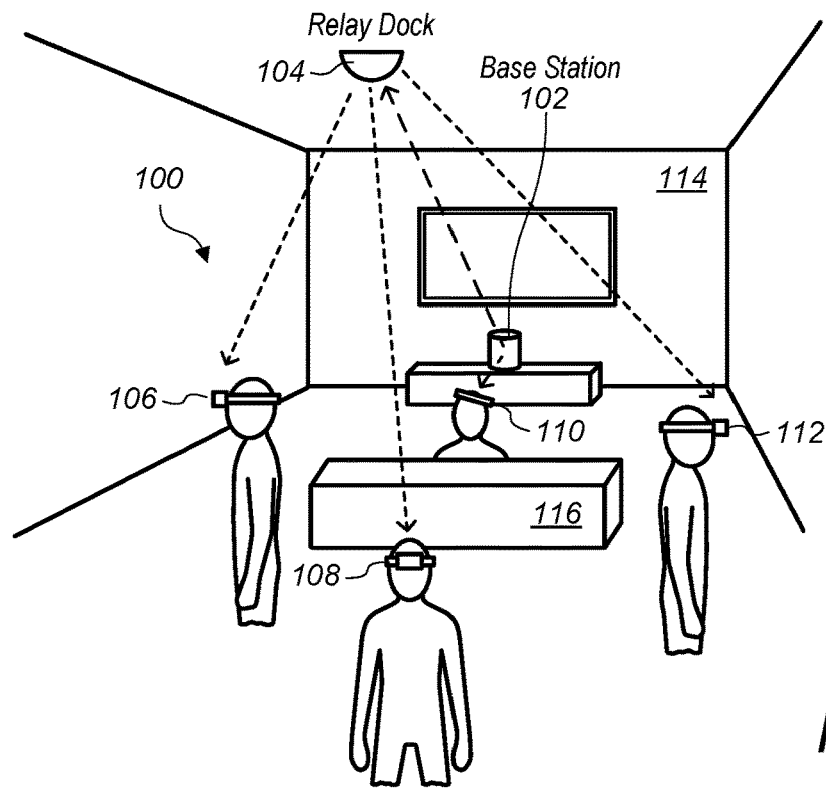
FIG. 1A illustrates a wireless communication system comprising a base station, a relay dock, and user devices, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Wireless communication systems using high-frequency waves may communicate large amounts of data between devices. For example, millimeter waves having wavelengths between 1 millimeter and 10 millimeters (e.g. 30-300 GHz waves) may communicate data at rates at or greater than 1 gigabyte per second. However, such waves may not be able to penetrate walls or solid structures. Also, a user of a device sending or receiving such high-frequency waves may block the waves by positioning the user's body or a part of the user's body between a transmitter and receiver of the wave. In addition, a user of a device sending or receiving such waves may move the device such that a solid structure blocks a current link path between a transmitter and a receiver. Additionally, in multi-user systems other users may position themselves or other objects in a link path between a transmitter and receiver of such high-frequency waves, such that a high-frequency wave is blocked by the other user or the other objects.

Often when a communication link path is established between a transmitter and receiver using a millimeter wave, such as between a user device and a base station, the transmitter and the receiver perform a scan or sweep operation to determine a best direction for the transmitter to direct a millimeter wave that is directed to the receiver, e.g. a best link path. For example, though millimeter waves may not penetrate walls or other solid structures, millimeter waves may be reflected off of a wall, floor, ceiling etc. Thus, if a direct line of sight is not available between a transmitter of a millimeter wave and a receiver, other link paths, such as those using a reflection off of a surface may be chosen as alternative link paths to a clear line-of-sight link path.

Also, a transmitter of a millimeter wave may include an array of antennae elements and a receiver may include an array of antennae elements. In such systems, different combinations of sending and receiving antennae elements and configurable parameters of such antennae elements may be adjusted to form a directional wave signal between a transmitter and a receiver, e.g. a link path. Also, such systems may test different combinations of antennae elements and configurable parameters of the antennae elements to determine a best link path from a transmitter to a receiver, such as a link path between a base station and a user device. For example, a transmitter may determine a direction to transmit a millimeter wave that results in better reception of the millimeter wave at the receiver as compared to other directions. Such scans or sweeps may be performed to initially establish a link path between a transmitter of a millimeter wave and a receiver of the millimeter wave. Also, such scans or sweeps may be at least partially repeated each time a current link path is obstructed and a new link path is established. In many cases, such scans or sweeps may take a non-trivial amount of time to perform, and for many applications interruptions in communication while such scans or sweeps are being performed may prevent the application from functioning properly. For example, when a link path is obstructed, data exchange between a transmitter and receiver, such as a user device and a base station, may be interrupted until a scan or sweep is completed and a new link path is established between the transmitter and the receiver. Such interruptions may cause poor performance of an application operating on a user device and may negatively impact a user experience.

For example, in virtual reality or augmented reality applications, a user device may wirelessly communicate significant amounts of data with a base station using a millimeter wave. However, as the user moves within a space, such as a room, objects may block a current link path between the user device and the base station. In such situations, the user device or base station may perform a scan or sweep to identify a new link path (if available) or may lose communications between the user device and base station. However, even if a new link path is available, communication between the user device and the base station may stop while a scan or sweep is being performed to identify the new link path. This may cause a virtual reality or augmented reality scene being displayed on the user device to freeze, or otherwise become non-responsive. Such interruptions may produce a negative user experience. Also, in other applications, such as streaming video or audio, such interruptions may cause a negative user experience.

In some embodiments, a wireless communication system may utilize position information about a user device relative to a communication station (e.g. a base station or a relay dock) to identify a link path, (e.g. a direction to transmit a millimeter wave) without performing scanning or sweeping operations, such as are performed in previous systems, or may reduce an amount of scanning or sweeping that is performed to identify a link path between a base station and a user device as compared to previous systems.

In some embodiments, position information about a user device may be received from one or more position sensors already included in the user device. For example, many user devices may include GPS systems, and/or inertial measurement units, such as gyroscopes and/or accelerometers, that collect position information about a current location or orientation of the user device. In some embodiments, such position information may be used by applications such as a virtual reality application that adjusts a display scene based on a position or orientation of the user device. In some embodiments, such position information collected by position sensors of a user device may also be provided to a beam forming decision engine to determine a link path between a base station or relay dock and the user device.

In addition, in some embodiments, a wireless communication system may include a base station and one or more relay docks positioned in a space with one or more user devices, wherein the relay docks provide additional paths to the user device in addition to paths between the user device and the base station. For example, if a structure blocks a link path between a user device and a base station, a relay dock may be positioned such that a link path between the relay dock and the user device is not obstructed, despite the link path between the user device and the base station being obstructed. In some embodiments, a relay dock may be positioned in a space at one or more locations that are less likely to be obstructed than a base station location. For example, in some embodiments, one or more relay docks may be mounted at an elevated position, such as on a wall or ceiling of a room. Also, in some embodiments, one or more relay docks may be mounted on a floor.

In some embodiments, a communication station, such as a relay dock or base station, may further utilize position information about a user device to hand-off communications with the user device between a base station and a relay dock or between relay docks. For example, in some embodiments, a beam forming decision engine may determine a direction of travel of a user device or a predicted change in orientation of a user device and may predict a future location or future orientation of the user device based on the determined direction of travel or the predicted orientation change. In some embodiments, a beam forming decision engine, may also identify a relay dock or a base station that has a link path to the predicted future location or future orientation of the user device that is not obstructed. For example, a beam forming decision engine may determine a next communication link device (e.g. base station or relay dock) and a next communication link path from the next communication link device prior to losing a current communication link or prior to the current communication link being degraded more than a threshold amount. In such embodiments, the beam forming decision engine may switch communications between the user device and a base station from a current link path to a new link path that utilizes a next relay dock or next base station. In some embodiments, such communication link changes may be performed without performing a sweep or scan operation to identify the next relay dock or the next base station. Also, in some embodiments, a beam forming decision engine may predict a future location of the user device relative to the next relay dock or the next base station, such that scanning or sweeping to identify a beam direction for a directional wave signal to be transmitted from the next relay dock or base station to the user device may be omitted or an amount of sweeping or scanning may be reduced. For example, a beam forming decision engine may use position information to determine how to form a beam directed at a predicted location or orientation of a user device without needing to sweep or scan for a link path to the user device at the predicted location or orientation. Thus, interruption time when changing link paths may be reduced or eliminated, which may improve application performance and user experience.

In some embodiments, a relay dock may extend a range of a wireless communication system. For example, in some embodiments, a relay dock may include a signal filter, such as a band pass filter, and an amplifier that amplifies a millimeter wave signal received from a transmitting device, such as a base station or another relay dock. Thus a relay dock may extend a geographic range of a base station or other relay dock beyond a geographic range of a wireless communication system without the relay dock, for example a base station.

FIG. 1A illustrates a wireless communication system comprising a base station, a relay dock, and user devices, according to some embodiments. For example, wireless communication system 100 includes base station 102, relay dock 104 and user devices 106, 108, 110, and 112.

In some embodiments, a wireless communication system, such as wireless communication system 100, may provide wireless communications for a virtual reality or augmented reality system. For example, user devices 106, 108, 110, and 112 may be virtual reality or augmented reality head mounted displays and may communicate with base station 102 to update a scene displayed on the head mounted displays. In some embodiments, user devices may include other types of devices, such as tablets, phones, laptops, etc.

In some embodiments, user devices, such as user devices 106, 108, 110, and 112 and a base station, such as base station 102, may be in a common room, such as room 114. However, due to a position or orientation of respective ones of the user devices or the base station, a link path, such as a line of sight link path or a reflected link path, between a user device and a base station may be obstructed. For example in FIG. 1A, the user of user device 108 has his back to base station 102 such that the user's body blocks a link path from base station 102 to user device 108. Also, other objects, such as furniture (e.g., a couch, chair, etc.) 116, may obstruct a reflective link path from user device 108 to base station 102 via another surface, such as a floor of room 114. As another example, users of user devices 106 and 112 are oriented such that the bodies of the users at least partially obstruct a link path between base station 102 and user devices 106 and 112.

In such situations, a relay dock, such as relay dock 104, may provide an alternative link path to a user device that is not obstructed or that has a clearer line of sight between a user device and the relay dock. For example, relay dock 104 provides a link path between relay dock 104 and base station 102 that avoids furniture 116 and a link path from relay dock 104 to user device 108 that avoids furniture 116. Also, because relay dock 104 is mounted overhead, relay dock 104 may provide a link path that is less obstructed by the body of the user of user device 108 than a link path between base station 102 and user device 108.

In some embodiments, user devices, such as user devices 106, 108, 110, and 112, may collect position and orientation information about the user devices and provide the position and/or orientation information to a base station or relay dock. For example, a user device may include a GPS system, an inertial measurement unit (IMU), or other position and/or orientation tracking sensors or systems that collect data about a position or orientation of the user device, for example a position or location in room 114. In some embodiments, a beam forming decision engine executing on a base station, relay dock, or a combination thereof, may utilize position information received from a user device or from other sensors to determine a direction for a directional wave signal to be transmitted from a base station or a relay dock to a user device and vice versa. For example, a beam forming decision engine may receive position information about user device 108 and may determine that relay dock 104 has a clearer line of sight to user device 108 than base station 102. Additionally, a beam forming decision engine may determine a vector direction from a relay dock or base station, such as relay dock 104, to a user device, such as user device 108. For example, a beam forming decision engine may receive position information indicating a location and/or orientation of user device 108, for example behind and slightly to the side of relay dock 104, and may determine a vector direction from relay dock 104 to user device 108 based on the position information. In some embodiments, a beam forming decision engine, may cause a beam forming element of an antennae array of a relay dock, base station, or user device, to form a directional wave signal, e.g. a beam, directed in the determined vector direction. For example, a beam forming decision engine may cause a beam former, such as beam former 166, to adjust one or more antennae elements of an antennae array of a relay dock, such as relay dock 104, to form a directional wave signal in a vector direction aimed at user device 108.

In some embodiments, a beam forming decision engine may determine a pose of a user device, wherein a pose comprises a location of the user device in a space, such as room 114, and an orientation of the user device at the location. For example, user device 108 is located behind furniture 116 and orientated away from base station 102. Note that if the user of user device 108 were to turnaround, the user device would be located in the same location, but would have a new pose with a different orientation. Also note, that if that were the case, e.g. that the user of user device 108 were to turnaround and change the orientation of user device 108, it may affect which link path is selected to communicate with user device 108. For example, if user device 108 were oriented towards base station 102, a link path between base station 102 and user device 108 would no longer be obstructed by the body of the person wearing user device 108. Thus, in some embodiments, a beam forming decision engine may determine a link path based on a pose that includes both a location of a user device in a space and an orientation of the user device at the location.

In some embodiments, a pose determined by a beam forming decision engine may be updated as an orientation of a user device changes. The pose may be updated based on position and/or orientation information that is provided to the beam forming decision engine. For example, a gyroscope included in user device 108 may collect orientation information and the orientation information may be provided to a beam forming decision engine as the user of user device 108 turns around.

In some embodiments, a beam forming decision engine may anticipate a future location or orientation of a user device and determine a next link path to communicate with the user device prior to a current link path becoming obstructed. For example, the user of user device 110 may begin to turnaround to talk to the user of user device 106. In such circumstances, a position or orientation sensor of user device 106 may measure the motion of user device 110 and may provide updated position and/or orientation information to a beam forming decision engine, for example included in base station 102. The beam forming decision engine may anticipate that the user of user device 110 is changing his orientation away from base station 102, based on the received position information and may select relay dock 104 as a next link path from base station 102 to user device 110. Furthermore, in some embodiments, the beam forming decision engine may use location and orientation information included in the position information to determine a vector direction from relay dock 104 to user device 110 at the anticipated orientation and location, such that relay dock 104 does not need to perform a scanning or sweeping operation to locate a link path from relay dock 104 to user device 110. In some embodiments, a relay dock, such as relay dock 104, may perform some scanning or sweeping to improve a link path between the relay dock and a user device, such as user device 110, but the scanning or sweeping may include fewer combinations of antennae elements and/or configurations than would be required if relay dock 104 did not already know a vector direction of user device 110 relative to relay dock 104. Because, position and/or orientation information is used by a beam forming decision engine to determine a relay dock and/or vector direction from the relay dock to a user device, a latency time for establishing a new or updated link path based on changes in user location or orientation may be reduced. This is because less or no time may be spent sweeping or scanning to determine a new or updated link path.

As discussed above, in some embodiments, a beam forming decision engine may be implemented at a base station, at a relay dock, in another system, such as a cloud computing system, or may have a distributed implementation across multiple devices, such as a base station and a relay dock.

Figure 1B:
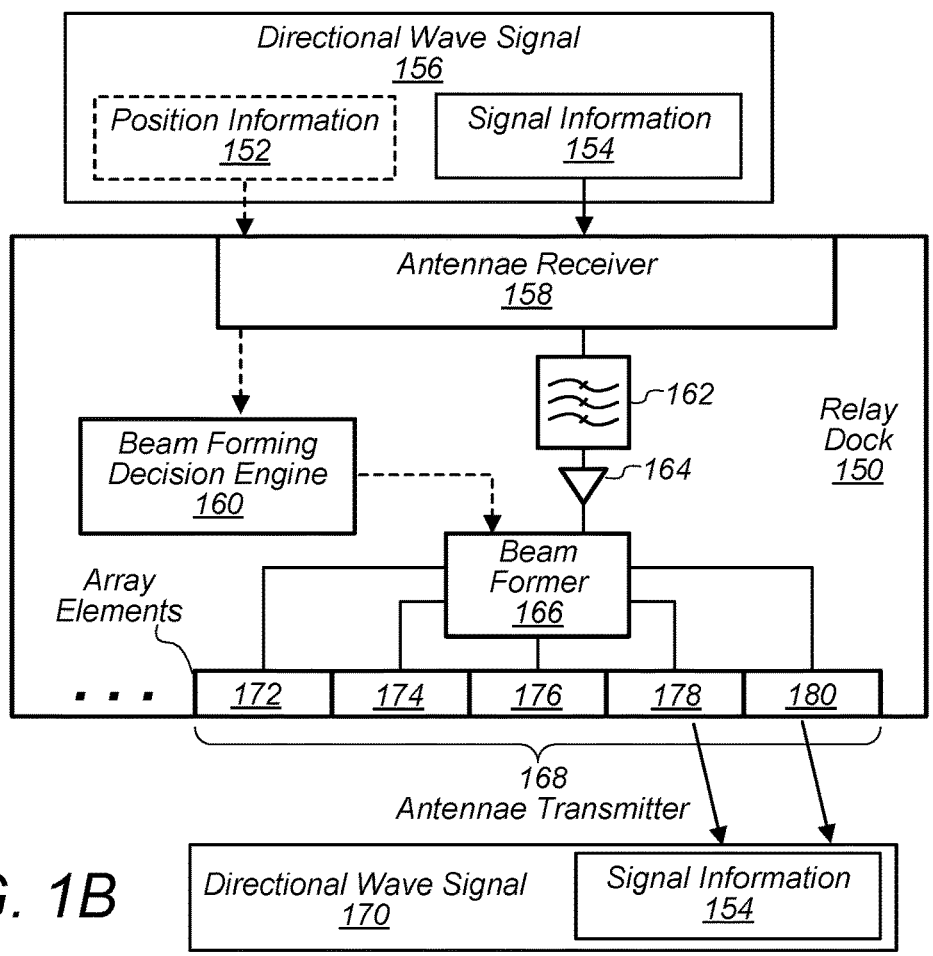
FIG. 1B is a block diagram illustrating components of a relay dock, according to some embodiments.

For example, FIG. 1B is a block diagram illustrating components of a relay dock 150 that includes a beam forming decision engine, according to some embodiments.

In FIG. 1B, relay dock 150 receives a directional wave signal 156 that includes signal information 154 and position information 152. For example, relay dock 150 may be a similar relay dock as relay dock 104 and may receive a directional wave signal 156 from a base station, such as base station 102. Also, a relay dock, such a relay dock 150, may receive a directional wave signal, such as directional wave signal 156, from a user device, such as user device 110, wherein the directional wave signal comprises signal information, such as signal information 154, and position information, such as position information 152.

In some embodiments, a relay dock may receive a directional wave signal via an antennae receiver, such as antennae receiver 158, and transmit directional signal waves via an antennae transmitter, such as antennae transmitter 168. Or, in some embodiments, a single antennae array of a relay dock may both receive and transmit directional wave signals. Additionally, in some embodiments, a relay dock may be connected to one or more base stations in other ways, such as via a wired connection.

Signal information included in a directional wave signal, such as directional wave signal 156 received at antennae receiver 158, may be filtered via a filter of a relay dock, such as filter 162. A filter, such as filter 162, may include a bandpass filter that filters noise and other signals from signals at a particular frequency band, such as a frequency band of a millimeter wave. Additionally, a relay dock, such as relay dock 150, may include a signal amplifier, such as signal amplifier 164, that amplifies a signal.

In some embodiments, a relay dock, such as relay dock 150, may include a beam forming decision engine, that receives position information included in a directional wave signal, such as position information 152 included in directional wave signal 156. The position information may include position information from a user device, such as a current location and/or orientation of the user device. In some embodiments, the position information may be received from a base station, wherein the base station tracks the most recent location and/or orientation of a user device. The beam forming decision engine may determine a vector direction from the base station to the user device based on the received position information and may cause an antennae transmitter of the relay dock, such as antennae transmitter 168 of relay dock 150, to cause a directional wave signal to be transmitted toward the user device directed in the determined vector direction. In some embodiments, a beam former, such as beam former 166, may select particular antennae elements of an antennae array to transmit the directional wave signal, such that the directional wave signal is directed in the determined vector direction. Also, a beam former, such as beam former 166, may adjust one or more other parameters of the antennae array elements, such as wave phase or amplitude to cause a transmitted directional wave signal to be directed in the determined vector direction. For example, a beam former, such as beam former 166, may adjust array elements 172, 174, 176, 178, or 180 differently to direct a directional wave signal in a particular direction, such as a determined vector direction. For example, directional wave signal 170 comprising signal information 154 may be directed in a determined vector direction determined by beam forming decision engine 160 based on position information 152 included in directional wave signal 156 received by relay dock 150 via antennae receiver 158.

Figure 2A:
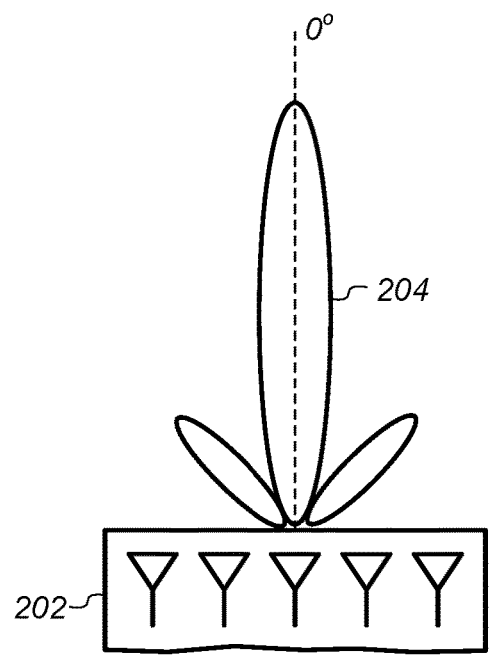
FIG. 2A illustrates a directional wave signal formed to direct a wave beam in a first direction, according to some embodiments.
Figure 2B:
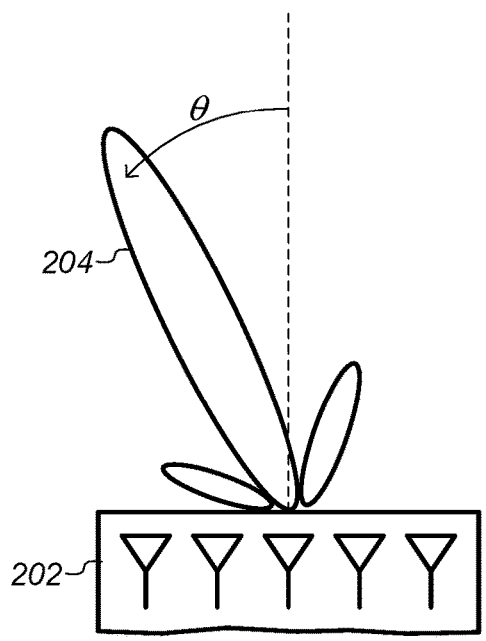
FIG. 2B illustrates a directional wave signal formed to direct a wave beam in another direction, according to some embodiments.
Figure 2C:
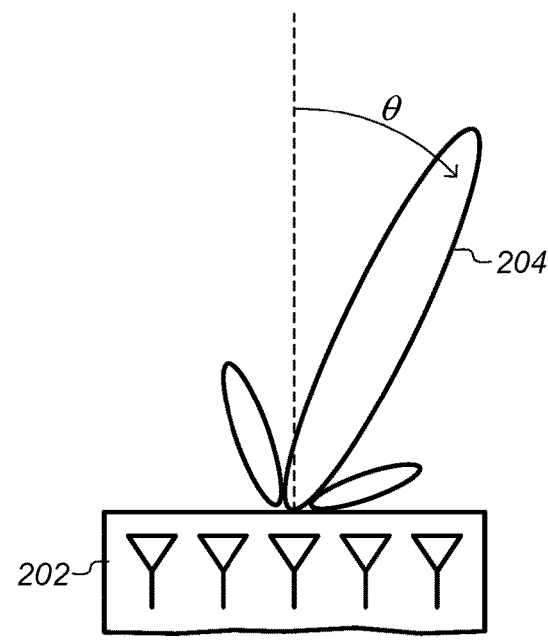
FIG. 2C illustrates a directional wave signal formed to direct a wave beam in an additional direction, according to some embodiments.

For example, FIGS. 2A-2C illustrates directional wave signals formed to direct a wave beam in different directions, according to some embodiments. For example, a beam forming decision engine, such as beam forming decision engine 160, may cause a directional wave signal to be directed in a first direction based on a particular set of position information for a user device. For example, FIG. 2A shows an antennae array 202 forming a beam 204 directed in a first vector direction. As another example, based on different sets of position information for a user device, a beam forming decision engine may cause directional wave signals to be transmitted from a relay dock in other directions. For example, FIG. 2B illustrates antennae array 202 forming a beam 204 directed in a different vector direction and FIG. 2C illustrates antennae array 202 forming a beam 204 directed in yet another vector direction. Note, that while FIGS. 2A-2C have been illustrated in two dimensions for the sake of clarity, in some embodiments a directional wave signal may form a three dimensional beam that is directed in a particular direction in three-dimensional space determined to be a direction in which a user device is located.

In some embodiments, a beam forming decision engine, such as beam forming decision engine 160, described in FIG. 1B, may be included in other components of a wireless communication system, such as a base station or user device.

Figure 3A:
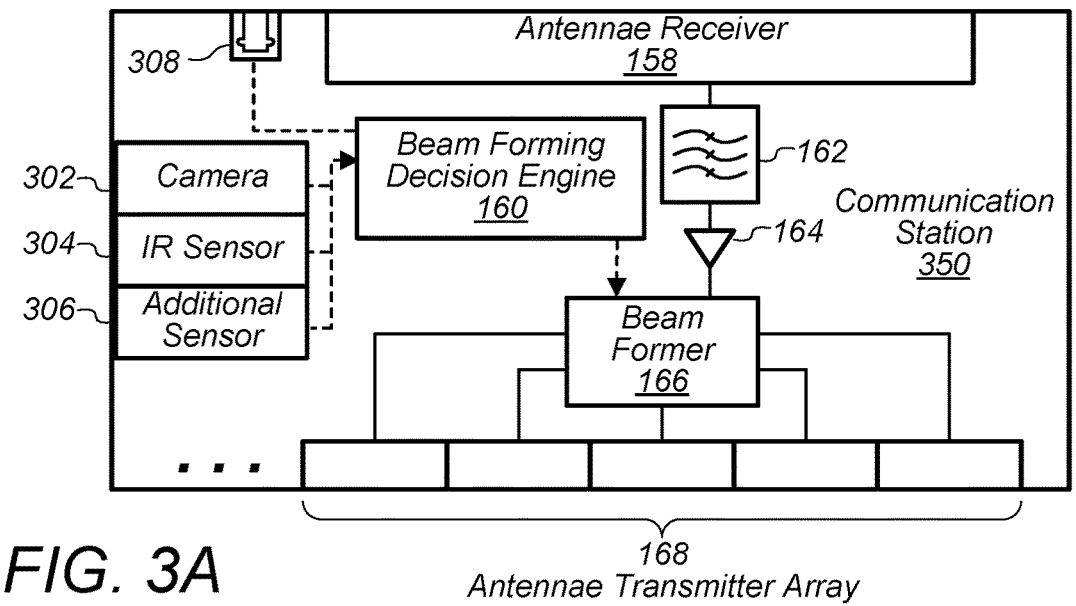
FIG. 3A is a block diagram illustrating components of a communication station, such as a base station or a relay dock, according to some embodiments.

For example, FIG. 3A is a block diagram illustrating components of a communication station, such as a base station or a relay dock, according to some embodiments. Communication station 350, which may be a relay dock or a base station, includes an antennae receiver 158 and an antennae transmitter 168 similar to relay dock 150. Communication station 350 also includes a filter 162 and an amplifier 164 similar to relay dock 150. In addition, communication station 350 includes a beam forming decision engine 160 and beam former 166 similar to relay dock 150.

In some embodiments a communication station, such as a relay dock or a base station, may additionally include a wired connection port configured to couple the communication station to another communication station, such as another base station or another relay dock. For example, communication station 350 includes port 308 that may be coupled to another base station or relay dock. In such embodiments, signal information such as signal information 154 and/or position information such as position information 152 may be received by a communication station, such as communication station 350, via a wired connection, such as a wire connected to port 308.

In some embodiments, a communication station, such as a relay dock or base station, may include one or more sensors configured to track a user device's location and/or orientation. For example, communication station 350 includes camera 302, infrared sensor 304, and one or more additional sensors 306. In some embodiments, a beam forming decision engine, such as beam forming decision engine 160, may receive information from one or more sensors such as camera 302, infrared sensor 304, or additional sensors 306 and may utilize the received information to determine a pose of a user device relative to the communication station. In some embodiments, a beam forming decision engine may receive information from sensors coupled to the communication station in addition to or in place of receiving position information from a user device, base station, or other relay dock.

Figure 3B:
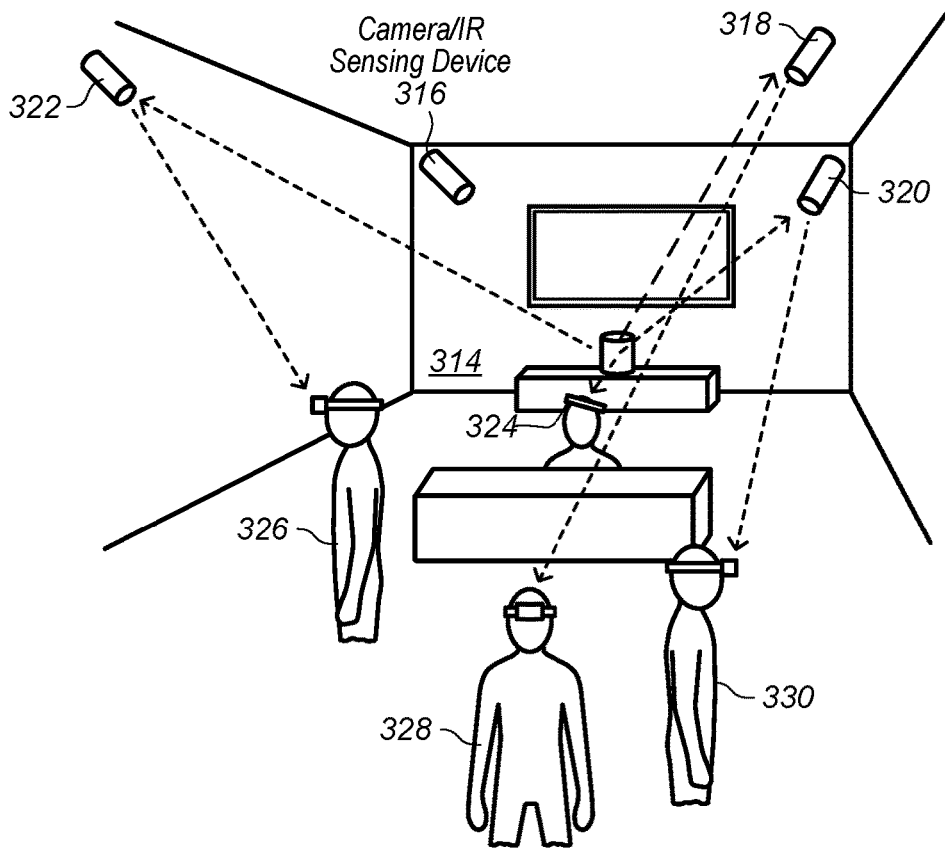
FIG. 3B illustrates a wireless communication system that includes relay docks with cameras or infrared sensors, according to some embodiments.

For example, FIG. 3B illustrates a wireless communication system that includes relay docks with cameras or infrared sensors, according to some embodiments. Room 314 illustrated in FIG. 3B includes relay docks 316, 318, 320, and 322 mounted at elevated positions in room 314, such that cameras, such as camera 302, infrared sensors, such as IR sensor 304, or such that other sensors, such as additional sensors 306, may track users, such as users 324, 326, 328, and 330 in room 314. In some embodiments, the sensors included in relay docks 316, 318, 320, and 322 may determine a location of a user in room 314, an orientation of a user relative to a base station or relay dock, or both. In some embodiments, sensors may be separate from a relay dock or base station, but may be coupled to the relay dock or base station via a wired or wireless connection. For example, in some embodiments a camera, IR sensor, or additional sensor may be mounted in a room separate from a relay dock and may be coupled to the relay dock or a base station, for example via a wired connection. In other embodiments, such sensors may be included in a relay dock or base station.

Figure 4A:
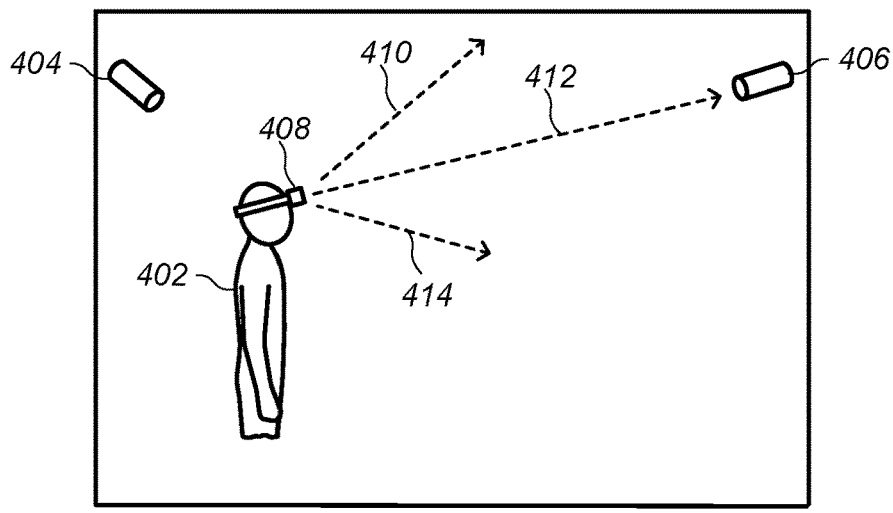
FIGS. 4A-4C illustrate a user device that emits a light signal and relay docks that include cameras or infrared sensors, according to some embodiments.
Figure 4B:
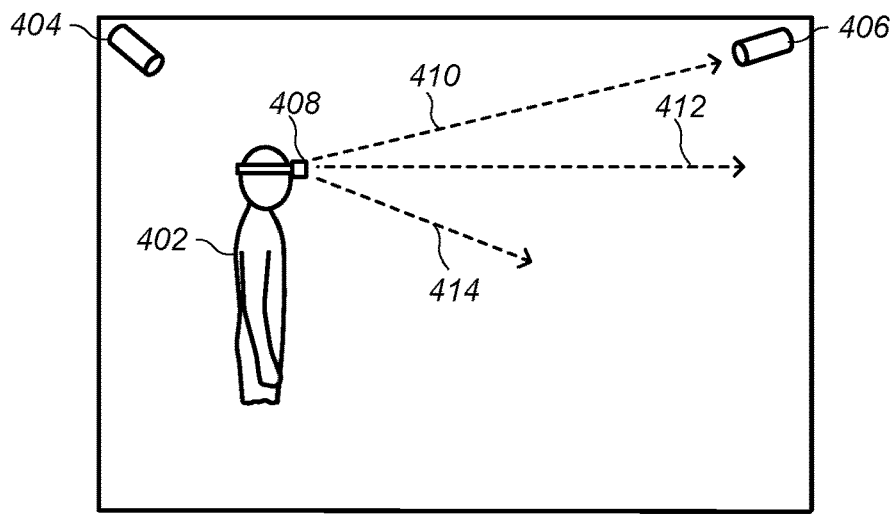
Figure 4C:
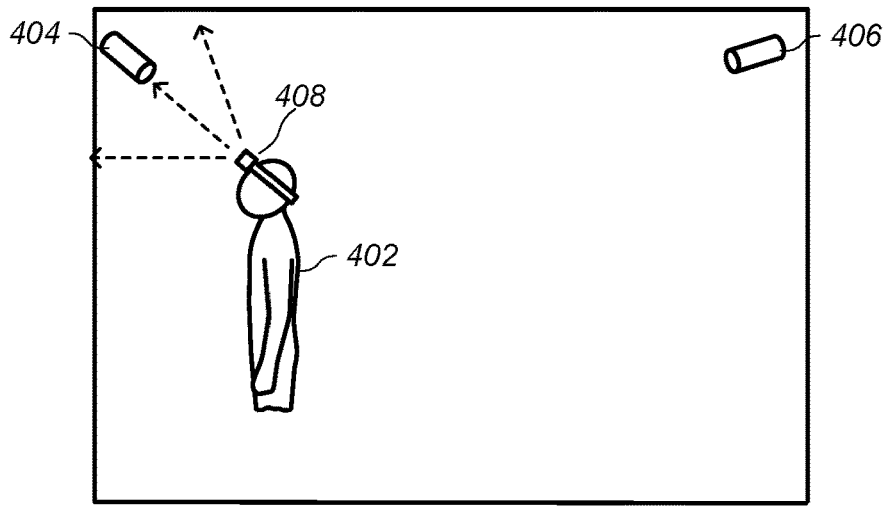

FIGS. 4A-4C illustrate a user device that emits a light signal and relay docks that include cameras or infrared sensors, according to some embodiments.

In some embodiments, in which infrared sensors, cameras, or other sensors are used to determine a location of a user device or an orientation of a user device, a user device may include an emitter that emits a light signal, such as an infrared signal or a laser signal that a sensor, such as an IR sensor or other type of sensor may detect to determine an orientation or location of the user device.

For example, user device 408 being worn by user 402 may emit one or more light signals. For example, in some embodiments, light signal 410 may be a different signal than light signal 412 and 414, and vice versa for each of light signals 410, 412, and 414. Thus, a beam forming decision engine of a relay dock or a base station, may determine an orientation of a user device based on a light signal received by a sensor, such as sensor 406. For example, a beam forming decision engine may determine that user 402 is looking upwards based on light signal 412 being received at sensor 406, and may determine that user 40 is looking straight ahead based on light signal 410 being received at sensor 406. Additionally, a beam forming decision engine may determine that user 408 is facing to the left based on sensor 406 detecting a light signal, and may determine that user 402 is facing towards the right based on sensor 404 detecting a light signal, as shown in FIG. 4C. In some embodiments, additional sensors, may be included in a room, as shown in FIG. 3B, and a beam forming decision engine may determine an orientation of a user based on which sensor is detecting a light signal and which light signal the sensor is detecting of a plurality of light signals emitted from a user device.

Figure 5A:
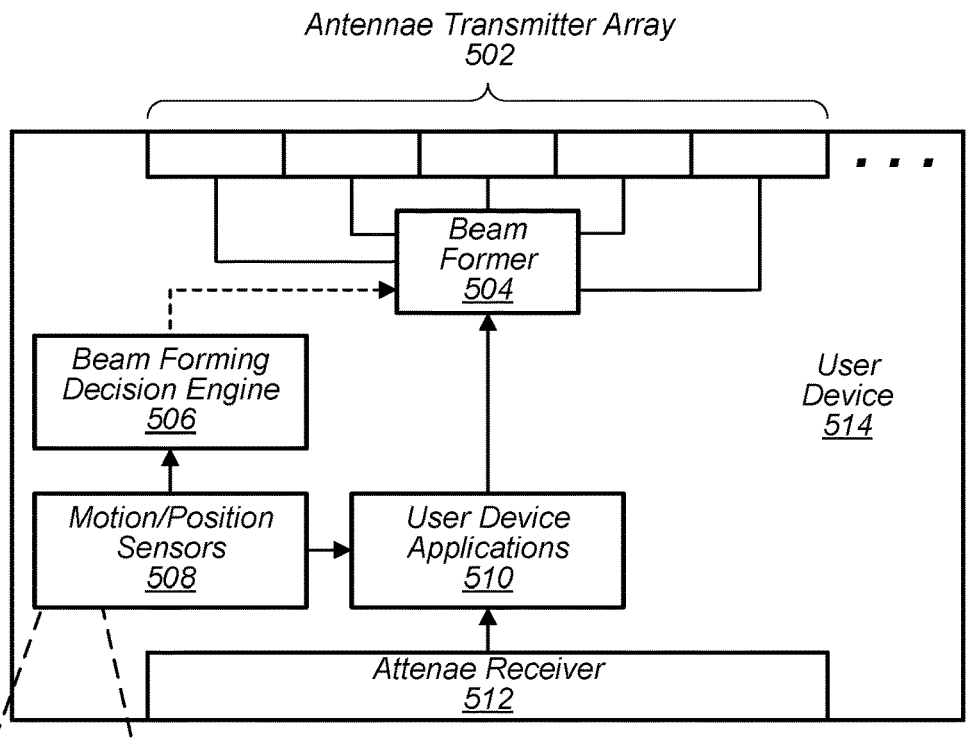
FIG. 5A is a block diagram illustrating components of a user device, according to some embodiments.

FIG. 5A is a block diagram illustrating components of a user device, according to some embodiments. While a user device may include several other additional components, for the sake of clarity, such additional components have been omitted from FIG. 5A, such that at least some components of a user device related to beam forming may be discussed. User device 514 includes an antennae transmitter array 502 and an antennae receiver 512. In some embodiments, an antennae receiver and an antennae transmitter may be included in a common antennae array or such functions, e.g. transmitting and receiving, may be performed via a common antenna. In some embodiments, a user device, such as user device 514, may include a beam former, such as beam former 504, configured to adjust one or more parameters of antennae array elements to direct a directional wave signal in a determined vector direction. In some embodiments, a user device, such as user device 514, may also include a beam forming decision engine, such as beam forming decision engine 506. In some embodiments, a beam forming decision engine of a user device, such as beam forming decision engine 506, may determine a vector direction for a receiving device that is to receive a directional wave signal beaming transmitted from the user device, and may cause a beam former, such as beam former 504, to cause a directional wave signal to be transmitted in the determined direction. In some embodiments, a beam forming decision engine of a user device may receive position information from motion/position sensors of a user device, such as motion/position sensors 508.

In some embodiments, position information, such as location and/or orientation information about a user device, such as user device 514, may also be included in a directional wave signal being transmitted from the user device. For example, motion/position information from motion/position sensors 508 may be included with other data from other user device applications that is being communicated from the user device. Additionally, in some embodiments, other applications of a user device, such as user device applications 510, may utilize motion/position information from motion/position sensors of a user device, such as motion/position sensors 508, to perform various tasks.

Figure 5B:
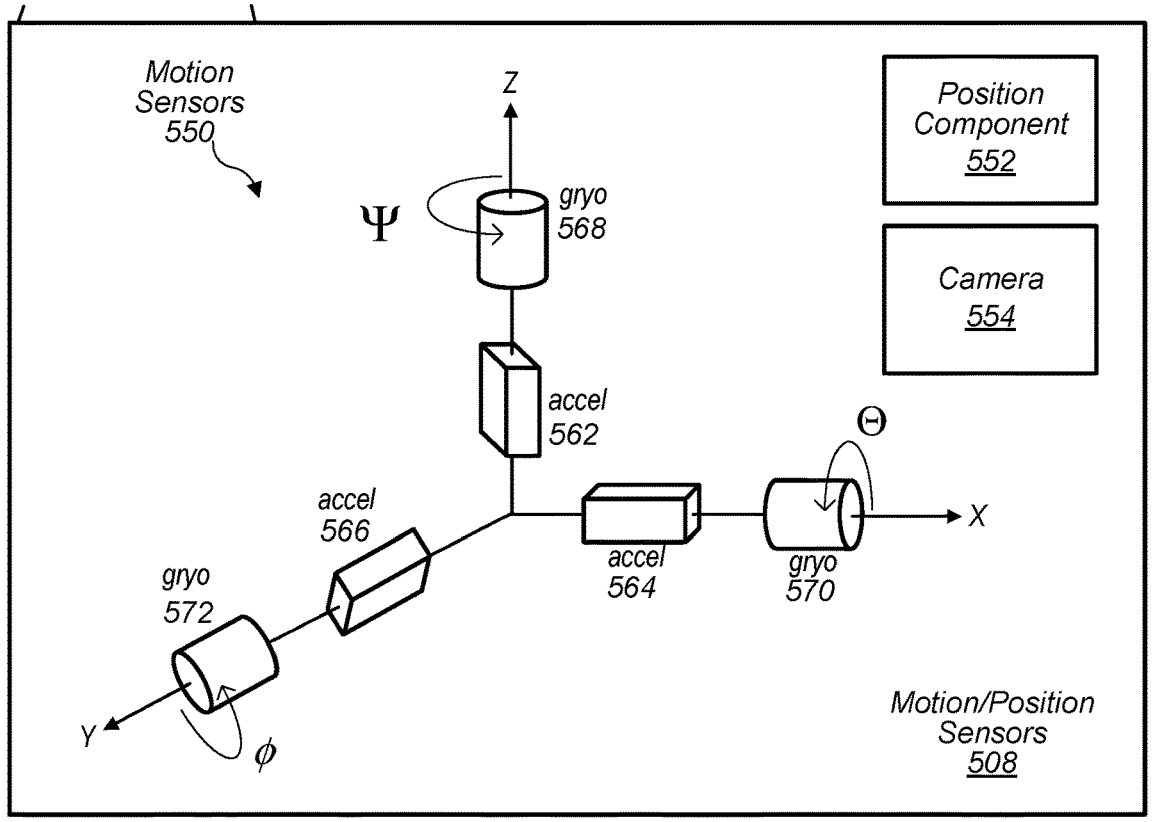
FIG. 5B is a more detailed view of position/motion sensors of a user device, according to some embodiments.

FIG. 5B is a more detailed view of position/motion sensors of a user device, according to some embodiments. Motion/position sensors 508 include motion sensors 550, position component 552, and camera 554. In some embodiments, a position component, such as position component 552 may include a GPS component, or other suitable positioning system.

In some embodiments, a motion sensor, such as motion sensor 550, may include an, accelerometer, such as accelerometer 562 aligned with a Z-axis and configured to measure acceleration in the Z-direction, an accelerometer, such as accelerometer 564 aligned with a X-axis and configured to measure acceleration in the X-direction, and an accelerometer, such as accelerometer 566 aligned with a Y-axis and configured to measure acceleration in the Y-direction. In addition, a motion sensor, such as motion sensors 550, may include a gyroscope, such as gyroscope 568 configured to measure angular motion ($\psi$) about the Z-axis, a gyroscope, such as gyroscope 570 configured to measure angular motion ($\theta$) about the X-axis, and a gyroscope, such as gyroscope 572 configured to measure angular motion ($\varphi$) about the Y-axis. In some embodiments, motion sensors, such as motion sensors 550 may include additional sensors such as magnetometers, pressure sensors, temperature sensors, etc. The accelerometers and gyroscopes, such as accelerometers 562, 564, and 566, and gyroscopes 568, 570, and 572, may measure both translation motion and angular motion in multiple directions and about multiple axis. Such measurements may be used by one or more processors to determine motion of an object mechanically coupled to the motion sensors in three-dimensional space, such as a location or orientation of a user device in three-dimensional space.

FIG. 6 is a flow diagram illustrating a communication station forming a directional wave signal based on received position information about a user device, according to some embodiments.

At 602, a communication station, such as a relay dock or base station, receives position information about a location and/or orientation of a user device. For example, the position information may include GPS coordinates from a GPS system, accelerometer data from an accelerometer of a user device, orientation information from a gyroscope of a user device, and/or other types of position information. In some embodiments, a user device may determine a location and orientation based on sensors included in the user device and may provide the output of such determinations to a communication station as position information.

At 604, a beam forming decision engine of a communication station determines a pose of the user device relative to one or more communication stations such as a base station and a relay dock.

At 606 the beam forming decision engine selects a communication station, such as a base station or a relay dock with a more direct link path to the user device. In some embodiments, a beam forming decision engine at 606 may further take into account interference between signals being sent to other user devices when selecting a directional wave signal to be sent to the user device. For example in a multi-user environment, directional wave signals may be sent to multiple user devices located in a common space, such as a room. In such situations, a beam forming decision engine may consider signal paths of other directional wave signals being sent to other user devices in the space when selecting a relay dock. In some embodiments, a beam forming decision engine may forego selecting a relay dock with a most direct link path between the relay dock and a user device and instead select a relay dock with a next most direct link path in order to avoid interference with other directional wave signals.

At 608, the selected relay dock forms a directional wave signal (e.g. a millimeter wave beam) directed to the user device. Also, the user device may form a directional wave signal (e.g. a millimeter wave beam) directed at the selected relay device. In either case, a beam forming decision engine may use position information for the user device relative to the selected relay dock to determine vector directions for the directional waves that are sent between the user device and the relay dock. The determined vector directions may be used by a beam former of the respective devices to form a beam directed toward the recipient device without performing a sweep or scan to determine a best direction for transmitting the directional wave. In some embodiments, some scanning or sweeping may be performed to refine a directional wave signal, but the sweeping or scanning time required may be significantly reduced as compared to sweeping or scanning times of previous systems, because a vector direction for the directional wave is pre-determined prior to the sweeping or scanning.

FIG. 7 is a flow diagram illustrating a communication station selecting a next relay dock or base station to be used to communicate with a moving user device, according to some embodiments.

In some embodiments, a beam forming decision engine may anticipate a future location or orientation of a user device based on a direction of travel of the user device or a direction of orientation change of the user device.

For example, at 702, a beam forming decision engine receives position information about a user device at two or more points in time.

At 704, the beam forming decision engine determines a direction of travel of the user device or a direction of orientation change of the user device based on position information at the two or more points in time. For example, if a user wearing a user device is walking across a room from left to right, position information across multiple points in time may indicate a velocity in a given direction, such as from left to right across the room, and a beam forming decision engine may determine that the user is likely to continue in the direction from left to right across the room for at least some amount of time. Based on the determined direction of travel or direction of orientation change of the user device, at 706, the beam forming decision engine may determine a next relay dock or base station to provide a link path to the user device if the direction of travel or the direction of orientation change continues as predicted.

At 708, the beam forming decision engine may continue to monitor a signal strength of a current link path between the user device and a current communication station, such as a relay dock or base station, that is communicating with the user device via the current link path. If the signal strength of the current link path remains above a threshold signal strength level, the beam forming decision engine may continue to use the currently selected communication station, e.g. relay dock or base station, and the current link path from the current communication station to communicate with the user device. However, if the signal strength of the current link path falls below the threshold signal strength, at 710, the beam forming decision engine may determine whether a link path to the user device using the next selected base station or relay dock has a greater signal strength than the current link path. If the signal strength of a link path from a next selected relay dock or base station is less than a signal strength of the current link path, the beam forming decision engine may continue to use the current link path to communicate with the user device. However, at 712 if a link path using the next selected relay dock or base station has a greater signal strength than the current link path the beam forming decision engine may seamlessly hand over communications to the user device from the currently selected relay dock or base station to the next selected relay dock or base station. Such a procedure may reduce latencies during hand offs between relay docks and/or base stations because a next relay dock or base station is pre-selected prior to a link path being lost. Also, in some embodiments, a vector direction from a next selected relay dock or base station to a user device may be determined by a beam forming decision engine prior to a current link path being lost. Thus, not only is time to establish a new link path subsequent to a loss of a link path reduced by not needing to test different relay docks to select a next relay dock after a link path is lost, but the time is also reduced by not requiring a selected relay dock to perform scanning or sweeping to determine a direction in which to form a beam.

Figure 8:
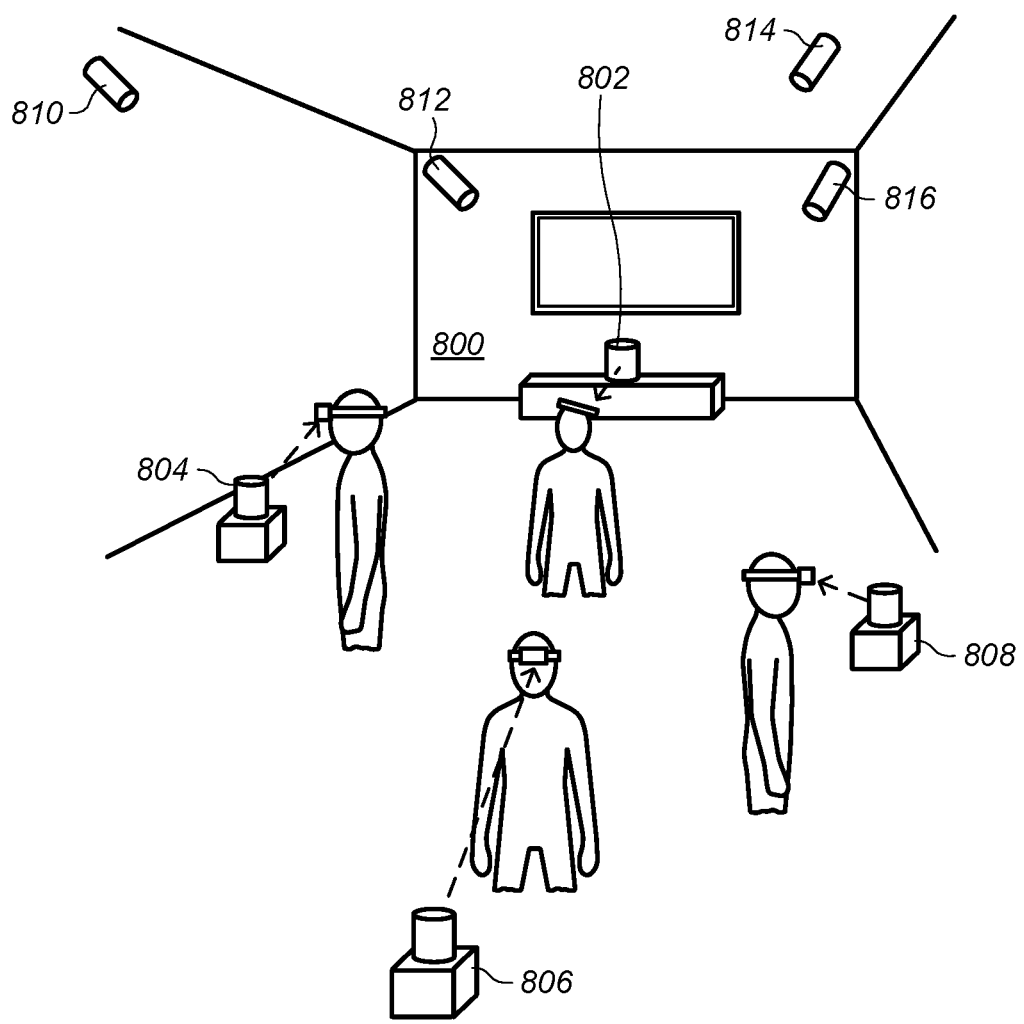
FIG. 8 illustrates a wireless communication system comprising multiple base stations and multiple cameras or infrared sensors, according to some embodiments.

FIG. 8 illustrates a wireless communication system comprising multiple base stations and multiple cameras or infrared sensors, according to some embodiments.

In some embodiments, multiple base stations, such as base stations 802, 804, 806, and 808 in room 800 may share multiple relay docks, such as relay docks 810, 812, 814, and 816. In some embodiments, relay docks, such as relay docks 810, 812, 814, and 816, may include sensors such as cameras or IR sensors and may share collected position information about user devices with multiple base stations, such as base stations 802, 804, 806, and 808. Also, in some embodiments, beam forming decision engines of base stations, such as base stations 802, 804, 806, and 808, may coordinate with one another and may hand-off users as the users move between areas covered by the different base stations. For example, if one of the user devices closest to base station 804 were to be moved to be closer to base station 808, base station 804 may hand over the user device to base station 808 to manage.

In some embodiments, relay docks may be located in various positions in a room to achieve unobstructed lines-of-sight with users depending on room configurations and other parameters.

Figure 9:
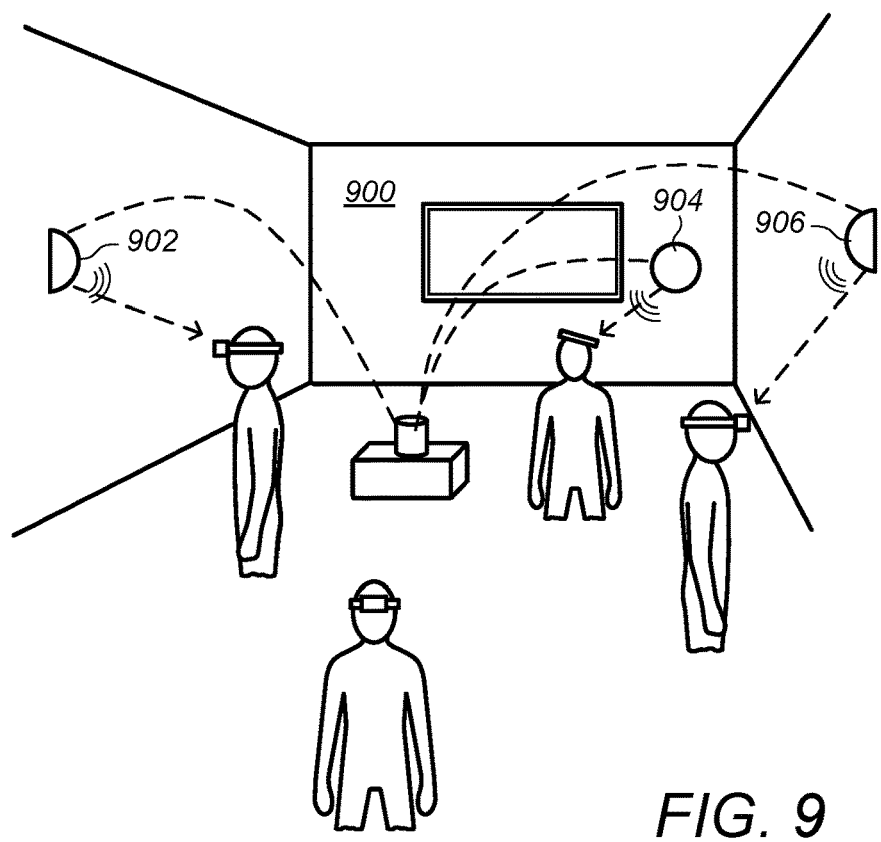
FIG. 9 illustrates a wireless communication system comprising wall-mounted relay docks, according to some embodiments.

For example, FIG. 9 illustrates a wireless communication system comprising wall-mounted relay docks, according to some embodiments. In FIG. 9, relay docks 902, 904, and 906 are mounted on walls of room 900.

Figure 10:
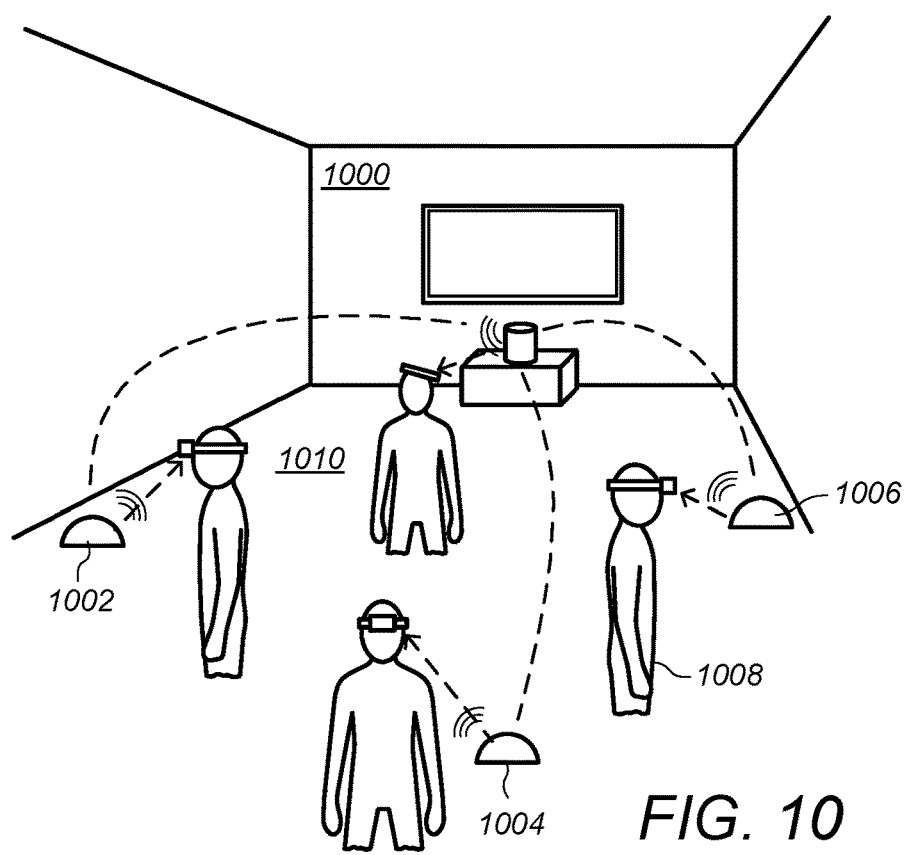
FIG. 10 illustrates a wireless communication system comprising floor-mounted relay docks, according to some embodiments.

As another example, FIG. 10 illustrates a wireless communication system comprising floor-mounted relay docks, according to some embodiments. In FIG. 10, relay docks 1002, 1004, 1006, and 1008 are mounted on floor 1010 of room 1000.

In some embodiments, relay docks may be mounted in a combination of locations. For example in a large room, such as an auditorium, relay docks may be mounted on side walls, a ceiling of the auditorium, and on the floor of the auditorium. In some embodiments, various other combinations of mounting locations may be used for relay docks and/or base stations.

Example Computer System

Figure 11:
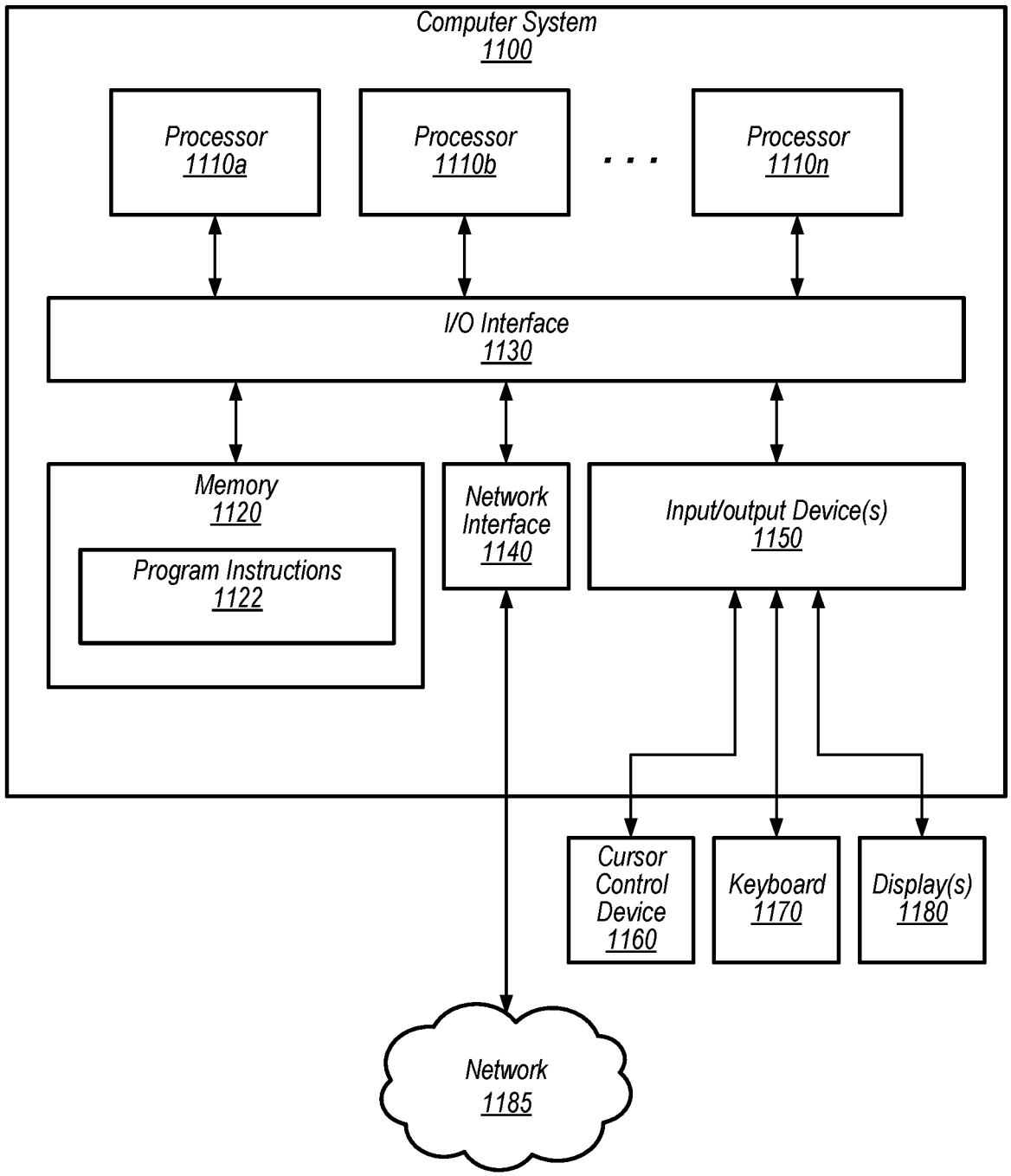
FIG. 11 illustrates an example computer system that may be included in a user device, relay dock, or base station, according to some embodiments.

FIG. 11 illustrates an example computer system 1100 that may implement a base station, relay dock, user device or any other ones of the components described herein, (e.g., any of the components described above with reference to FIGS. 1-10), in accordance with some embodiments. The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a beam forming decision engine, relay dock, base station, user device or other components of a wireless communication system, as described herein may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions 1122 and/or position information accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An electronic device comprising:
   an antennae array; and
   a computer, storing program instructions, that when executed via one or more processors, cause the one or more processors to implement:
   a beam forming decision engine configured to:
     receive information indicating:
       a location of a user device; and
       an orientation of the user device;
     determine a beam direction for a beam to be formed via the antennae array of the electronic device based on:
       the location of the user device relative to the antennae array of the electronic device; and
       the orientation of the user device relative to the antennae array of the electronic device; and
     cause one or more antennas of the antenna array of the electronic device to form a beam having the determined beam direction to direct a directional wave signal from the electronic device to the user device,
   wherein the electronic device is configured to operate in a common space with the user device.

2. The electronic device of claim 1, wherein the electronic device is included in:
   a desktop computer system;
   a laptop computer system;
   a handheld computer system;
   a television; or
   another type of electronic device.

3. The electronic device of claim 2, wherein the user device comprises:
a virtual reality system;
an augmented reality system;
a tablet;
a phone;
a laptop; or
another type of electronic device.

4. The electronic device of claim 3, wherein the common space is a same room, and wherein the electronic device is configured to operate in the same room with the user device.

5. The electronic device of claim 4, wherein the beam forming decision engine is further configured to:
cause the one or more antennas of the antenna array to form the beam having the determined beam direction such that the directional wave signal is reflected off of a wall of the room in order to direct the directional wave signal to the user device.

6. The electronic device of claim 1, wherein the beam forming decision engine is further configured to:
predict a future location of the user device relative to the electronic device based on the received information;
predict a future orientation of the user device relative to the electronic device based on the received information; and
in response to an interruption in communication between the electronic device and the user device:
determine, for resumed communication subsequent to the interruption, a beam direction for a beam to be formed via the antennae array, based on:
the predicted future location of the user device relative to the electronic device and
the predicted future orientation of the user device relative to the electronic device.

7. The electronic device of claim 6, wherein the electronic device is configured to resume communication with the user device, subsequent to the interruption, without performing a sweeping operation to identify the location or orientation of the user device.

8. The electronic device of claim 1, further comprising:
one or more infrared sensors configured to detect infrared light emitted by the user device, wherein the location or orientation of the user device is determined based, at least in part, on the detected infrared light.

9. A user device, comprising:
an antennae array; and
a computer, storing program instructions, that when executed via one or more processors, cause the one or more processors to implement:
a beam forming decision engine configured to:
receive information indicating:
a location of an electronic device, located in a common space with the user device;
determine a beam direction for a beam to be formed via the antennae array of the user device based on:
the location of the electronic device relative to the antennae array of the user device; and
an orientation of the electronic device relative to the antennae array of the user device; and
cause one or more antennas of the antenna array of the user device to form a beam having the determined beam direction to direct a directional wave signal from the user device to the electronic device.

10. The user device of claim 9, wherein the user device comprises:
a virtual reality system;
an augmented reality system;
a tablet;
a phone;
a laptop; or
another type of electronic device.

11. The user device of claim 10, wherein the electronic device is included in:
a desktop computer system;
a laptop computer system;
a handheld computer system;
a television; or
another type of electronic device.

12. The user device of claim 11, wherein the user device is configured to operate in a common room with the electronic device.

13. The user device of claim 12, wherein the user device is further configured to:
cause the directional wave signal to be reflected off of a wall in the common room in which the user device and the electronic device are located in order to direct the directional wave signal to the electronic device.

14. The user device of claim 9, further comprising:
a position or orientation sensor; or
a sensor configured to determine a position or orientation of the user device based on received signals.

15. The user device of claim 14, wherein the beam forming engine is further configured to determine the beam direction for the beam to be formed via the antennae array of the user device based on:
one or more measurements from the position or orientation sensor of the user device; or
one or more measurements from the sensor of the user device that is configured to determine the position or orientation of the user device based on the received signals.

16. A non-transitory, computer-readable, medium storing program instructions that, when executed by one or more processors, cause the one or more processors to:
receive information indicating:
a location of a first device located in a common space with a second device; and
an orientation of the first device located in the common space with the second device;
determine a beam direction for a beam to be formed via an antennae array of the second device based on:
the location of the first device relative to the antennae array of the second device; and
the orientation of the first device relative to the antennae array of the second device; and
cause one or more antennas of the antenna array of the second device to form a beam having the determined beam direction to direct a directional wave signal from the second device to the first device.

17. The non-transitory, computer-readable medium of claim 16, wherein the first or second device comprises:
a virtual reality system;
an augmented reality system;
a tablet;
a phone;
a laptop; or
another type of electronic device.

18. The non-transitory, computer-readable medium of claim 17, wherein a remaining one of the first or second device comprises:
- a desktop computer system;
- a laptop computer system;
- a handheld computer system;
- a television; or
- another type of electronic device.

19. The non-transitory, computer-readable medium of claim 16, wherein the program instructions, when executed by the one or more processors, further cause the one or more processors to:
- predict a future location of the first device relative to the second device based on the received information;
- predict a future orientation of the first device relative to the second device based on the received information; and
- in response to an interruption in communication between the first device and the second device:
  - determine, for resumed communication subsequent to the interruption, a beam direction for a beam to be formed via the antennae array of the second device, based on:
    - the predicted future location of the first device relative to the second device and
    - the predicted future orientation of the first device relative to the second device.

20. The non-transitory, computer-readable medium of claim 19, wherein the program instructions, when executed by the one or more processors, further cause the one or more processors to:
- resume communication with the first device, subsequent to the interruption, without performing a sweeping operation to identify the location or orientation of the first device relative to the second device.

* * * * *

UNITED STATES PATENT AND TRADEMARK OFFICE
CERTIFICATE OF CORRECTION

| | |
|---|---|
| PATENT NO. | : 11,831,368 B2 |
| APPLICATION NO. | : 17/589731 |
| DATED | : November 28, 2023 |
| INVENTOR(S) | : Yi Jiang et al. |

It is certified that error appears in the above-identified patent and that said Letters Patent is hereby corrected as shown below:

In the Drawings

Sheet 5, FIG. 5A, item 512 "Attenae" should be "Antennae".

Sheet 5, FIG. 5B the labels for the gyroscopes 568, 570, and 572, the phrase "gryo" should be substituted with "gyro" for each of items 568, 570, and 572.

Signed and Sealed this
Twentieth Day of February, 2024

Katherine Kelly Vidal
*Director of the United States Patent and Trademark Office*